(12) United States Patent
Deneroff et al.

(10) Patent No.: US 7,197,589 B1
(45) Date of Patent: Mar. 27, 2007

(54) SYSTEM AND METHOD FOR PROVIDING ACCESS TO A BUS

(75) Inventors: Martin M. Deneroff, Palo Alto, CA (US); Steven C. Miller, Livermore, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/315,806

(22) Filed: May 21, 1999

(51) Int. Cl.
*G06F 13/00* (2006.01)
*G06F 13/36* (2006.01)

(52) U.S. Cl. ..................... 710/302; 710/118
(58) Field of Classification Search ............. 710/301, 710/302, 300, 316
See application file for complete search history.

(56) References Cited

U.S. PATENT DOCUMENTS

| | | | | |
|---|---|---|---|---|
| 3,470,542 A | * | 9/1969 | Trantanella | 340/825.52 |
| 3,579,229 A | * | 5/1971 | Tripp | 341/117 |
| 3,665,404 A | * | 5/1972 | Werner | 710/262 |
| 4,484,273 A | * | 11/1984 | Stiffler et al. | 710/110 |
| 4,980,854 A | * | 12/1990 | Donaldson et al. | 710/117 |
| 5,265,212 A | * | 11/1993 | Bruce, II | 710/113 |
| 5,396,602 A | * | 3/1995 | Amini et al. | |
| 5,481,679 A | * | 1/1996 | Higaki et al. | 710/316 |
| 5,481,680 A | * | 1/1996 | Larson et al. | 710/112 |
| 5,625,824 A | * | 4/1997 | Melo et al. | |
| 5,778,194 A | * | 7/1998 | McCombs et al. | |
| 5,870,573 A | * | 2/1999 | Johnson | 710/316 |
| 5,933,610 A | * | 8/1999 | Chambers et al. | 711/113 |
| 6,073,188 A | * | 6/2000 | Fleming | 710/38 |
| 6,073,195 A | * | 6/2000 | Okada | 710/301 |
| 6,141,708 A | * | 10/2000 | Tavallaei et al. | 710/62 |
| 6,185,520 B1 | * | 2/2001 | Brown et al. | |

(Continued)

FOREIGN PATENT DOCUMENTS

JP 01265345 A * 10/1989

(Continued)

OTHER PUBLICATIONS

PCI Local Bus Specification revision 2.1 Jun. 1, 1995.*

(Continued)

*Primary Examiner*—Paul R. Myers
(74) *Attorney, Agent, or Firm*—Baker Botts L.L.P.

(57) ABSTRACT

A computer system (10) includes a bus controller (12), a bus (14), a plurality of processing devices (16) and a plurality of enabling switches (18). Each enabling switch (18) corresponds to a separate one of the processing devices (16). Each processing device (16) sends an access request (24) to arbitration logic (22) in the bus controller (12), requesting access to the bus (14). The arbitration logic (22) selects one of the access requests (24) according to a priority protocol. The arbitration logic (22) generates a control signal (20) associated with the selected access request (24). The control signal (20) is provided to the enabling switch (18) corresponding to the processing device (16) that sent the selected access request (24). The enabling switch (18) enables access to the bus (14) for the processing device (16) in response to the control signal (20). In this manner, the computer system (10) can limit a number of processing devices (16) having access to the bus (14) in order to control a load on the bus (14).

18 Claims, 2 Drawing Sheets

U.S. PATENT DOCUMENTS

| | | | |
|---|---|---|---|
| 6,209,053 B1* | 3/2001 | Kurtz | |
| 6,212,590 B1* | 4/2001 | Melo et al. | |
| 6,260,159 B1* | 7/2001 | Garnett et al. | 714/15 |
| 6,330,656 B1* | 12/2001 | Bealkowski et al. | 709/226 |
| 6,338,107 B1* | 1/2002 | Neal et al. | 710/302 |
| 2004/0188736 A1* | 9/2004 | Brindle et al. | 257/296 |

FOREIGN PATENT DOCUMENTS

| | | | |
|---|---|---|---|
| JP | 10092169 A | * | 4/1998 |

OTHER PUBLICATIONS

The IEEE Standard Dictionary of Electrical and Electronics Terms Sixth Edition 1996 p. 229.*

Websters New Riverside University Dictionary 1988 p. 320.*

Physical Properties of Gates 3.1-3.60.*

The American Heritage Dictionary, Second College Edition, 1982, p. 71.*

* cited by examiner

SYSTEM AND METHOD FOR PROVIDING ACCESS TO A BUS

BACKGROUND OF THE INVENTION

A peripheral component interconnect (PCI) bus typically has multiple peripheral devices connected thereto. The peripheral devices use the PCI bus for communications within a computer system. As the operating frequency of the PCI bus increases, bus loading on the PCI bus limits a number of peripheral devices that be connected to the PCI bus at any given time while insuring uncorrupted data communications over the PCI bus. Because of such limitations, it is difficult and costly to implement computer systems, particularly servers, that generally need many peripheral devices on the PCI bus.

Previous efforts to solve this problem include the use of bus repeaters. A bus repeater uses logic to retransmit the signals of a primary, or master, PCI bus to a secondary, or slave, PCI bus. However, bus repeaters significantly reduce useable bus bandwidth and only support a limited subset of defined PCI bus operations. The logic necessary to implement the repeater function is rather complex and thus becomes a source of system unreliability. Moreover, a bus repeater necessarily adds another PCI bus to the computer system, increasing the complexity of the computer system. Therefore, it is desirable to have a capability to handle a large number of peripheral devices on a PCI bus despite the loading problems introduced by a multi-device implementation.

SUMMARY OF THE INVENTION

From the foregoing, it may be appreciated that a need has arisen for a PCI bus implementation that is capable of having multiple peripheral devices connected thereto despite the constraints of loading limitations on the PCI bus. In accordance with the present invention, a system and method for providing access to a bus are provided that substantially eliminate or reduce disadvantages and problems associated with conventional bus implementations.

According to an embodiment of the present invention, there is provided a system for providing access to a bus that includes a bus controller with a plurality of processing devices coupled to the bus controller by a bus. A plurality of enabling switches, each associated with a corresponding processing device, are coupled to the bus. The plurality of enabling switches provide access to the bus for their corresponding processing device in response to control signals generated by the bus controller. The bus controller receives access requests from the plurality of processing devices, arbitrates the access requests according to a predetermined priority protocol, and generates a control signal corresponding to a selected access request. The control signal causes an enabling switch associated with a particular processing device that sent the selected access request to allow access to the bus for the particular processing device. The enabling switches that do not provide access to the bus make it appear that the corresponding processing devices are not coupled to the bus. Thus, processing devices not given access to the bus do not provide a load on the bus. In this manner, loading on the bus can be controlled and limited.

The present invention provides various technical advantages over conventional bus implementations. For example, one technical advantage is to couple multiple peripheral devices to a bus that would normally cause overloading of the bus. Another technical advantage is to control a number of peripheral devices that have access to the bus. Yet another technical advantage is to use higher a frequency bus without affecting a number of peripheral devices coupled thereto. Still another technical advantage is to determine access to the bus through a priority protocol. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
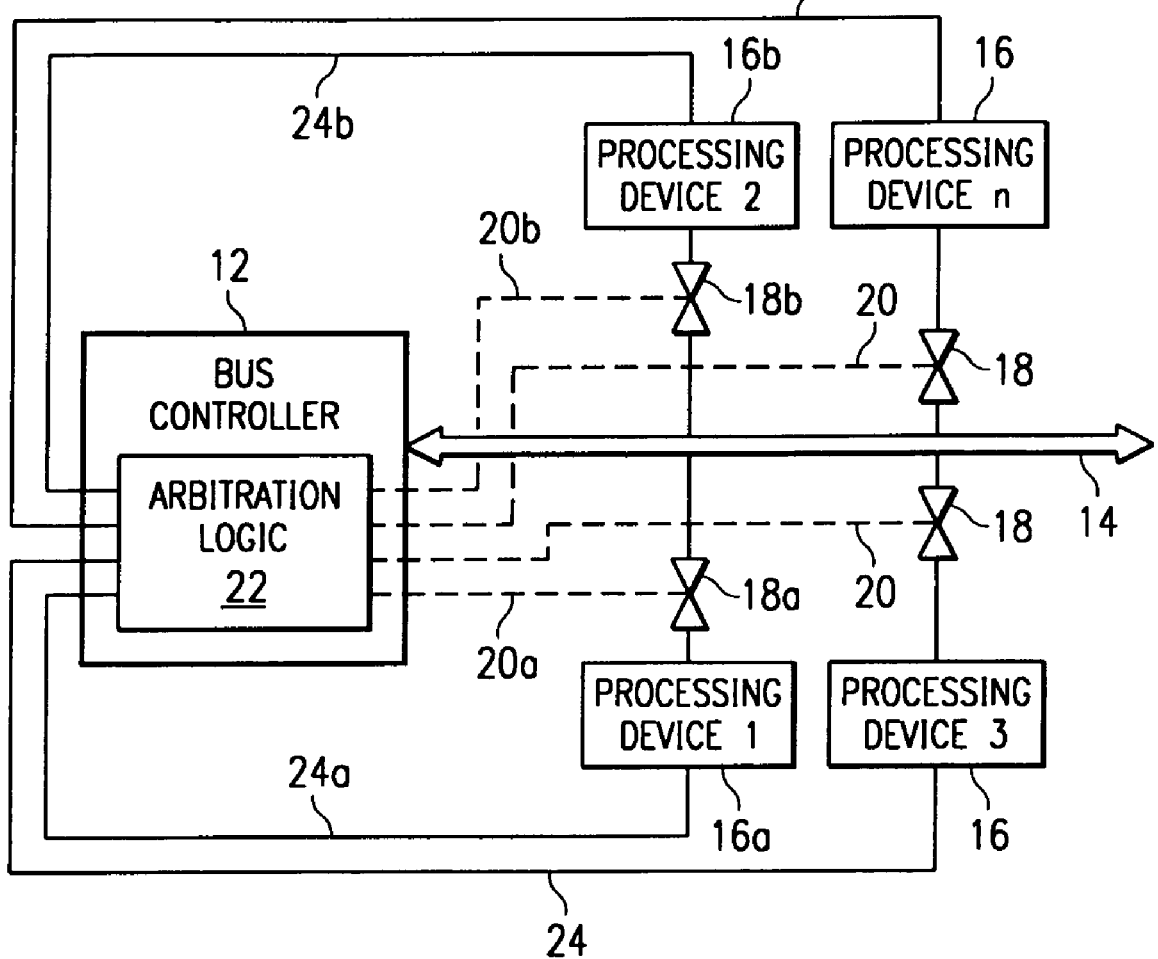
FIG. 1 illustrates a simplified block diagram of a computer system.

FIG. 1 is a block diagram of a computer system 10. Computer system 10 includes a bus controller 12, a bus 14, a plurality of processing devices 16, and a plurality of enabling switches 18. Each processing device 16 has an associated enabling switch 18 that controls when processing device 16 has access to bus 14. Each enabling switch 18 is driven by a control signal 20 generated by bus controller 12. Bus controller 12 includes arbitration logic 22 to select one of a plurality of access requests 24 received from the plurality of processing devices 16 in order to generate a control signal 20 corresponding to the selected access request 24. Enabling switches 18 may be stand alone devices, implemented within processing device 16, or implemented as part of bus 14.

In operation, processing devices 16 transmit access requests 24 to bus controller 12. Arbitration logic 22 in bus controller 12 determines which access request 24 has priority over the other access requests 24. Priority is determined according to a predetermined priority protocol that can implement a desired priority scheme using parameters that may include time of receipt if access request 24, the particular processing device 16 sending the request, and a weighting factor involving source and type of access request 24. Other parameters may be readily ascertainable by those skilled in the art and may be used as a basis in any combination to determine priority.

Arbitration logic 22 selects one of the access requests 24a received from the processing devices 16 and generates a control signal 20a associated with the selected access request 24a. Control signal 20a is provided to the enabling switch 18a corresponding to the processing device 16a that sent the selected access request 24a. Enabling switch 18a allows processing device 16a access to bus 14 in response to control signal 20a. When processing device 16a is finished with its access to bus 14, control signal 20a disables enabling switch 18a and decouples processing device 16a from bus 14.

After arbitration logic 22 selects an access request 24a based on the priority protocol, arbitration logic 22 determines a next access request 24b according to the priority protocol. A control signal 20b is generated in response to the determination of the next access request 24b. Control signal 20b enables enabling switch 18b to provide access to bus 14 for processing device 16b. At this point in time, both processing device 16*a* and processing device 16*b* have access to bus 14. This simultaneous access to bus 14 allows processing device 16*b* to see when processing device 16*a* is through accessing bus 14. When processing device 16*a* completes access to bus 14, processing device 16*b* may now access bus 14. In this manner, idle time on bus 14 is eliminated or substantially reduced.

Arbitration logic 22 may also be used to generate control signal 20 without an associated access request 24. Such generation may be performed for various operations to include testing of computer system 10. Also, as enabling switches 18 limit access to bus 14, processing devices 16 may be removed and replaced as desired without affecting operation of bus 14. Since enabling switches 18 can make it appear that processing devices 16 are not on bus 14, installation and repair may be performed on computer system 10 during operation. Enabling switches 18 may be implemented as pass transistors or any other type of conventional switching element or apparatus.

Bus 14 is preferably a PCI bus, though any other conventional bus types may be used in computer system 10. In a conventional PCI bus implementation, the higher the frequency of the bus operation, the smaller the number of processing devices that can be coupled to the bus at any given time. For example, four processing devices and the bus controller may be coupled to a 33 MHz PCI bus while only two processing devices and the bus controller may be coupled to a 66 MHz PCI bus. Thus, conventional PCI bus implementations provide added limitations as the desired operating frequency increases. Through the use of enabling switches 18, selection from a multitude of processing devices for coupling to bus 14 may be dynamically performed to increase a capability of computer system 10 regardless of the operating frequency of bus 14 so that higher operating frequency bus applications may be implemented.

Figure 2:
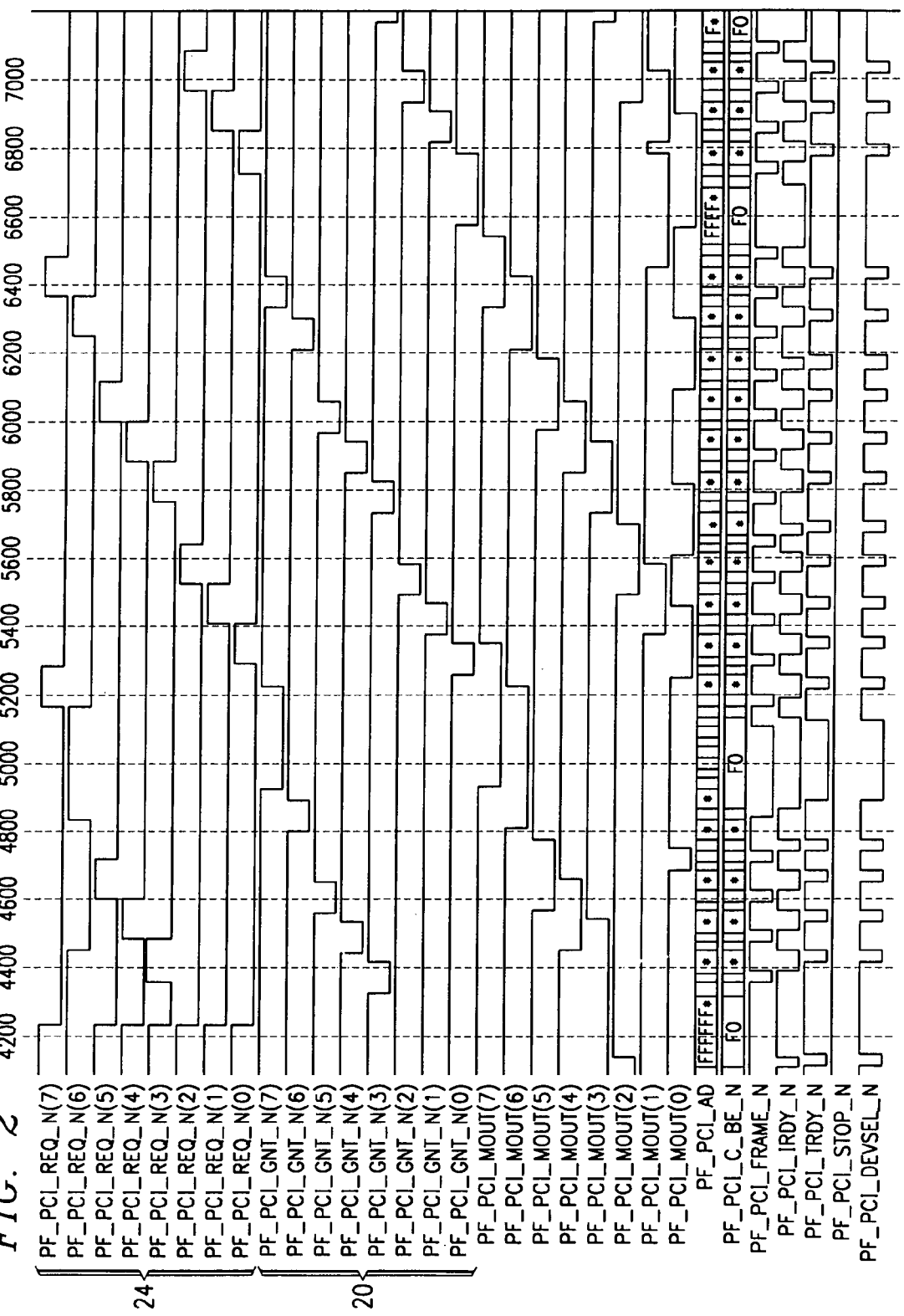
FIG. 2 illustrates a timing diagram for access to a bus of the computer system.

FIG. 2 shows a timing diagram for operation of computer system 10 with eight processing devices 16. Each processing device 16 generates an access request (PF_PCI_REQ_N(N)) upon desiring to communicate over bus 14. Arbitration logic 22 receives the access requests and selects one (PF_PCI_REQ_N(3)) based on the priority protocol. A control signal (PF_PCI_GNT_N(3)) associated with the selected access request is generated to grant access to bus 14 for the corresponding processing device 16*a*. Subsequently, arbitration logic 22 selects another access request (PF_PCI_REQ_N(4)) based on the priority protocol. A control signal (PF_PCI_GNT_N(4)) associated with the next selected access request is generated to provide access to bus 14 for its corresponding processing device 16*b*. Processing devices 16*a* and 16*b* have simultaneous access to bus 14 at this time. Processing device 16*a* completes its data transfer over bus 14 while processing device 16*b* awaits its turn to access bus 14. Upon completion of data transfer, access to bus 14 for processing device 16*a* is disabled and processing device 16*b* begins its data transfer over bus 14. This operating scenario is repeated for all access requests received by bus controller 12.

Thus, it is apparent that there has been provided, in accordance with the present invention, a system and method for providing access to a bus that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A method of providing access to a bus, comprising:
   receiving a plurality of device access requests for the bus, each of the plurality of device access requests being received from one of a plurality of processing devices not connected to the bus, each of the plurality of processing devices having a switch associated therewith;
   selecting a particular one of the plurality of device access requests according to a predetermined priority protocol;
   generating a control signal corresponding to the selected particular one of the plurality of device access requests;
   providing the control signal to a particular one of the plurality of processing devices that sent the selected particular one of the plurality of device access requests, the control signal enabling the switch associated with the particular one of the plurality of processing devices to connect the particular one of the plurality of processing devices to the bus;
   selecting a next one of the plurality of device access requests according to the predetermined priority protocol;
   generating a control signal corresponding to the selected next one of the plurality of device access requests;
   providing the control signal to a next one of the plurality of processing devices that sent the selected next one of the plurality of device access requests, the control signal enabling the switch associated with the next one of the plurality of processing devices to connect the next one of the plurality of processing devices to the bus prior to an end of the particular one of the plurality of processing devices being connected to the bus, the remaining ones of the plurality of processing devices not being connected to the bus in order to minimize a load on the bus.

2. The method of claim 1, wherein the bus is a PCI bus.

3. The method of claim 2, wherein the PCI bus operates at a frequency of at least 66 MHz.

4. The method of claim 1, wherein the plurality of device access requests are received from processing devices desiring to communicate over the bus.

5. The method of claim 1, further comprising:
   determining an end for the particular one of the plurality of processing devices to be connected to the bus;
   initiating access of the next one of the plurality of processing devices to the bus in response to the end for the particular one of the plurality of processing devices to be connected to the bus.

6. The method of claim 5, further comprising:
   generating a disabling control signal in response to the end for the particular one of the plurality of processing devices to be connected to the bus;
   disconnecting the particular one of the plurality of processing devices from the bus in response to the disabling control signal.

7. The method of claim 1, further comprising:
   limiting a number of generated control signals in order to control a load on the bus.

8. The method of claim 1, further comprising:
   generating a disable control signal for a request not selected in order to prevent connecting of an associated processing device to the bus.

9. A system for providing access to a bus, comprising:
   a bus controller;
   a plurality of processing devices capable of being connected to the bus controller by a bus;

a plurality of enabling switches on the bus, each enabling switch connected to a corresponding processing device, each enabling switch determining whether the corresponding processing device is connected to the bus in response to a control signal from the bus controller;

wherein the bus control receives a plurality of requests from the plurality of processing devices, the bus controller operable to select a highest priority request, the bus controller operable to generate a first control signal for a first enabling switch associated with a first processing device having the highest priority request, the first enabling switch connecting the first processing device to the bus for access thereto;

wherein the bus controller is operable to select a next highest priority request, the bus controller operable to generate a second control signal for a second enabling switch associated with a second processing device having the next highest priority request, the second enabling switch connecting the second processing device to the bus, the bus controller allowing the second processing device to be connected to the bus prior to disconnecting the first processing device from the bus, wherein remaining ones of the plurality of processing devices are not connected to the bus in order to minimize a load on the bus.

10. The system of claim 9, wherein the bus controller allows simultaneous connecting to the bus by a predetermined number of the plurality of processing devices in order to limit a load on the bus.

11. The system of claim 9, wherein the bus controller receives a plurality of device access requests from the plurality of processing devices for connecting to the bus.

12. The system of claim 11, wherein the bus controller arbitrates the plurality of device access requests from the plurality of processing devices according to a predetermined protocol.

13. The system of claim 9, wherein the bus is a PCI bus.

14. The system of claim 13, wherein the PCI bus operates at a frequency of approximately 66 MHz.

15. A PCI bus, comprising:

a plurality of pass transistors, each pass transistor operable to provide connecting of an associated processing device to the bus, each pass transistor operable to receive a control signal to connect and disconnect its associated processing device to and from the bus, wherein a first pass transistor connects a first processing device to the bus for access thereto in response to a first control signal, a second pass transistor connects a second processing device to the bus in response to a second control signal prior to disconnecting of the first processing device from the bus upon an end of access thereto, wherein the remaining ones of the plurality of pass transistors do not connect their respective processing devices to the bus when the first processing device and the second processing device are connected to the bus.

16. The PCI bus of claim 15, wherein a particular pass transistor receives an enable control signal in response to an access request sent by its associated processing device.

17. The PCI bus of claim 15, wherein a particular pass transistor is operable to disconnect its associated processing device from the bus such that the particular processing device does not appear to be connected to the PCI bus in order to reduce a load on the bus.

18. The PCI bus of claim 15, wherein each of the processing devices is operable to communicate at a 66 MHz rate.

* * * * *